US012243487B2

(12) United States Patent
Chen et al.

(10) Patent No.: US 12,243,487 B2
(45) Date of Patent: Mar. 4, 2025

(54) PIXEL COMPENSATION METHOD, PIXEL COMPENSATION STRUCTURE, AND DISPLAY PANEL

(71) Applicant: Shenzhen China Star Optoelectronics Semiconductor Display Technology Co., Ltd., Guangdong (CN)

(72) Inventors: Mingyao Chen, Guangdong (CN); Jinao Chen, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/761,310

(22) PCT Filed: Feb. 25, 2022

(86) PCT No.: PCT/CN2022/077994
§ 371 (c)(1),
(2) Date: Jul. 27, 2023

(87) PCT Pub. No.: WO2023/137828
PCT Pub. Date: Jul. 27, 2023

(65) Prior Publication Data
US 2024/0046878 A1 Feb. 8, 2024

(30) Foreign Application Priority Data
Jan. 20, 2022 (CN) ......................... 202210068619.0

(51) Int. Cl.
*G09G 3/32* (2016.01)
*G09G 3/20* (2006.01)
*G09G 3/3258* (2016.01)

(52) U.S. Cl.
CPC ......... *G09G 3/3258* (2013.01); *G09G 3/2074* (2013.01); *G09G 2300/0452* (2013.01); *G09G 2320/045* (2013.01); *G09G 2360/148* (2013.01)

(58) Field of Classification Search
CPC .... G09G 3/20; G09G 2310/08; G09G 3/3275; G09G 3/3233; G09G 3/3258;
(Continued)

(56) References Cited

U.S. PATENT DOCUMENTS 9,571,038 B1 * 2/2017 van Holland ........... H03F 3/211
2018/0012546 A1 * 1/2018 Li ......................... G09G 3/3258
2022/0044623 A1 * 2/2022 Park ....................... H05K 1/189

FOREIGN PATENT DOCUMENTS

CN 108428721 8/2018
CN 109147663 1/2019
(Continued)

*Primary Examiner* — Michael A Faragalla

(57) ABSTRACT

A pixel compensation method, a pixel compensation structure, and a display panel are provided, which includes obtaining optical sensing data of the pixel unit to be compensated, determining first compensation data of the first subpixel according to the optical sensing data, and determining the second compensation data of the second subpixel according to the first compensation data. The hardware design complexity of the application and the complexity of the pixel driver program is reduced, and the purpose of fast compensation and storage space saving is achieved.

18 Claims, 8 Drawing Sheets

(58) Field of Classification Search
CPC ......... G09G 3/2074; G09G 2300/0452; G09G 2320/045; G09G 2360/148
See application file for complete search history.

(56) References Cited

FOREIGN PATENT DOCUMENTS

| | | |
|---|---|---|
| CN | 109377942 | 2/2019 |
| CN | 109523955 | 3/2019 |
| CN | 109872691 | 6/2019 |
| CN | 110073433 | 7/2019 |
| CN | 111833794 | 10/2020 |
| KR | 10-2015-0027906 | 3/2015 |

* cited by examiner

-prior art-

-prior art-

-prior art-

-prior art-

-prior art-

PIXEL COMPENSATION METHOD, PIXEL COMPENSATION STRUCTURE, AND DISPLAY PANEL

RELATED APPLICATIONS

This application is a National Phase of PCT Patent Application No. PCT/CN2022/077994 having International filing date of Feb. 25, 2022, which claims the benefit of priority of China Patent Application No. 202210068619.0 filed on Jan. 20, 2022. The contents of the above applications are all incorporated by reference as if fully set forth herein in their entirety.

FIELD AND BACKGROUND OF THE INVENTION

The present disclosure relates to display technologies, and more particularly, to a pixel compensation method, a pixel compensation structure, and a display panel.

Electroluminescent components, as a current-type light-emitting device, have been increasingly used in display panels. Due to their self-luminous properties, electroluminescent display panels do not require a backlight, and have high contrast ratio, thin thickness, wide viewing angle, fast response, bendable, simple structure and process, and other advantages, so electroluminescent display panels gradually become the next generation of mainstream display panels. Generally speaking, a pixel circuit includes a display unit, a thin film transistor (TFT) and a storage capacitor (Capacitance). Through a fixed scanning waveform switching TFT, the voltage corresponding to the display data is charged to the capacitor, and through the voltage quantity, the display unit is controlled, and then the luminous brightness of the display unit is adjusted.

For a long time, the product process stability of TFT has been an important issue of the display screen, and it is also the main factor affecting the display screen. There are characteristic differences in the threshold voltage (Vth) and mobility (Mobility) of the driving TFT among multiple pixels and resulting in deviation in brightness. The brightness uniformity of the display screen will decrease, and regional spots or patterns will even be generated. Further, organic materials will gradually age over time and cannot be recovered. In areas that are lit for a long time, they will age faster, resulting in afterimages. The current external compensation technology can compensate the instability of TFT, including cut-off voltage and mobility, etc., and is often used in medium and large size displays. Generally speaking, electrical compensation can obtain voltage or current through the sensing signal line to determine the data to be compensated to realize the compensation on TFT characteristics. Optical compensation can compensate for the uniformity of the panel at one time. Because it is carried out through optical methods, compensation correction can effectively compensate for problems caused by various factors, such as Mura resulted from process equipment, etc.

Although external compensation can perform initial compensation optimization, with the increase of use time, the organic light-emitting device (OLED) will also begin to age. According to the current compensation method, OLED compensation cannot be effectively performed. Therefore, it will cause common image retention problems, which will seriously affect the user experience. At the same time, external compensation is usually compensated for each subpixel. Therefore, to save all compensation parameters, it requires a large storage space. For hardware design and driver implementation, it will be more complicated, which is not conducive to mass production use.

As shown in FIG. 1, it is a photosensitive detection circuit proposed in prior art, in which Sense sw refers to a sensing switch, REF TFT refers to a reference voltage of a TFT, INTRST refers to a reset switch, Cf refers to a high frequency capacitor, cF refers to a motherboard chip capacitor, FA refers to an isolation switch, LPF refers to a low-pass filter, CDS1A~CDS2A and CDS1B~CDS2B refer to control switches, MUX refers to a data selector or current integrator, and ADC refers to a digital to analog converter. During application process, when the photosensitive sensing part Sensor detects light, it will generate a corresponding current through photoelectric conversion. Finally, the current can be read by the current integrator MUX, and the current illuminance can be converted.

Taking a large-size OLED as an example, as shown in FIG. 2, it shows an arrangement of four-color pixel units proposed in prior art. The four-color pixel unit refers to adding one more subpixel on a basis of a traditional three-color pixel unit, that is, four-color subpixels. Most of them are adding white (White) based on red (Red), green (Green), and blue (Blue), while some are adding yellow (Y). Four types of pixels RGBW are shown in FIG. 2, where j refers to a number of columns of the pixel unit, and DL refers to a data line connected to the pixels in the pixel unit.

Combining the above-mentioned photosensitive detection circuit with a four-color pixel unit, the obtained pixel unit structure can be the structure shown in FIG. 3, wherein each subpixel of the pixel unit is provided with a photosensitive sensing part. The photosensitive sensing part can be arranged above or around the subpixel. In multiple pixel units, the subpixels with a same color in a same vertical direction share a same sensing line, where j refers to the number of rows of the pixel unit, and SL refers to the sense line connected with pixels in the pixel unit. The light quantity of each subpixel is detected by the photosensitive sensing part, and compensation data of the corresponding subpixel is obtained through a specific algorithm. The compensation data may be the pixel value of the subpixel.

Further, after process optimization based on the pixel unit in FIG. 3, the pixel unit structure as shown in FIG. 4 can be obtained. Arrangement of the pixel unit structure in FIG. 4 provides only two subpixels with photosensitive sensing parts in one pixel unit. The two subpixels with photosensitive sensing parts in adjacent pixel units are different. The photosensitive sensing parts in two adjacent pixel units can be arranged staggered in row and in column as shown in FIG. 4 or staggered in column (or in row) as shown in FIG. 5, wherein j refers to the number of rows of the pixel unit, and SL refers to the sensing line connected to the pixels in the pixel unit.

With the pixel unit structure shown in FIG. 4 or FIG. 5, although optimization of initial compensation can be performed, the OLED device will begin to age as the usage time increases. According to the above-mentioned hardware design and compensation method, the structure is more complicated. The implementation of the corresponding driving degree will also be more complicated, and all the compensation parameters need to be saved, which requires a large storage space.

SUMMARY OF THE INVENTION

In view of the above, the present disclosure provides pixel compensation method, a pixel compensation structure, and a display panel to perform optical data sensing and compensation for a pixel unit of a display device, and at the same time, it can calculate the optical characteristics of the pixel unit without the optical data sensing function and realizes fast compensation and saves storage space.

In order to achieve above-mentioned object of the present disclosure, one embodiment of the disclosure provides a pixel compensation method, including:

driving a pixel unit to be compensated that needs to be pixel compensated to emit light;

obtaining real optical sensing data of the pixel unit to be compensated, wherein the pixel unit to be compensated includes a first subpixel and a second subpixel disposed adjacent to the first subpixel, and the first subpixel is provided with a sensing part configured to sense brightness intensity;

determining first compensation data for the first subpixel according to the real optical sensing data; and determining second compensation data for the second subpixel according to the first compensation data.

In one embodiment of the pixel compensation method, the pixel unit to be compensated includes a plurality of subpixels to be compensated with different pixel colors, and the step of driving the pixel unit to be compensated that needs to be pixel compensated to emit light includes:

intermittently driving the plurality of subpixels to be compensated to emit light in an order according to an arrangement of the pixel colors of the plurality of subpixels to be compensated in a continuous period of time.

In one embodiment of the pixel compensation method, the sensing part includes a current multiplier, the step of obtaining the real optical sensing data of the pixel unit to be compensated includes:

obtaining current data and voltage data of the current multiplier in the sensing part, and taking the current data and the voltage data of the current multiplier as the real optical sensing data.

In one embodiment of the pixel compensation method, the step of obtaining the real optical sensing data of the pixel unit to be compensated includes:

obtaining a plurality of fusion optical sensing data corresponding to the plurality of subpixels to be compensated with different pixel colors in order; and taking the plurality of fusion optical sensing data as the real optical sensing date of the pixel unit to be compensated.

In one embodiment of the pixel compensation method, the step of obtaining a plurality of fusion optical sensing data corresponding to the plurality of subpixels to be compensated with different pixel colors in order includes:

turning on the plurality of subpixels to be compensated with a same color in the pixel unit to be compensated in a period; and sensing brightness of surrounding ones of the first subpixels and the second subpixels with a same color to obtain the fusion optical sensing data corresponding to the color.

In one embodiment of the pixel compensation method, the real optical sensing data includes first real optical sensing data for the first subpixel, and the step of determining first compensation data for the first subpixel according to the real optical sensing data includes:

generating a gray-scale-brightness characteristic curve associated with the first subpixel according to the first real optical sensing data; and determines the first compensation data of the first subpixel according to the gray-scale-brightness characteristic curve associated with the first subpixel.

In one embodiment of the pixel compensation method, the step of determines the first compensation data of the first subpixel according to the gray-scale-brightness characteristic curve associated with the first subpixel includes:

obtaining first theoretical optical sensing data for the first subpixel; and determining the first compensation data for the first subpixel according to the first theoretical optical sensing data and the first real optical sensing data.

In one embodiment of the pixel compensation method, the real optical sensing data includes second real optical sensing data for the second subpixel, and the step of determining the second compensation data for the second subpixel according to the first compensation data includes:

taking the second subpixel that needs to be compensated currently as a center pixel to be compensated;

obtaining compensation reference data for M compensation reference pixels adjacent to the center pixel to be compensated, wherein the M compensation reference pixels includes the first subpixel, the compensation reference data includes the first compensation data, and M is a natural number;

determining center compensation data for the center pixel to be compensated according to the compensation reference data for the M compensation reference pixels; and taking the center compensation data as the second compensation data for the second subpixel that needs to be compensated currently.

In one embodiment of the pixel compensation method, the step of determining the center compensation data for the center pixel to be compensated according to the compensation reference data for the M compensation reference pixels includes:

sorting the M compensation reference data according to value of the compensation reference data to obtain M sorted compensation reference data;

omitting a first and a last of the M sorted compensation reference data to obtain (M−2) sorted compensation reference data; and taking a center value of the (M−2) sorted compensation reference data as the center compensation data for the center pixel to be compensated.

In one embodiment of the pixel compensation method, the step of determining the center compensation data for the center pixel to be compensated according to the compensation reference data for the M compensation reference pixels further includes:

determining (M−2) luminance gain data according to the (M−2) sorted compensation reference data, wherein the (M−2) luminance gain data correspond to the (M−2) sorted compensation reference data in one to one; and determining the center compensation data for the center pixel to be compensated according to the (M−2) sorted compensation reference data and the (M−2) luminance gain data.

In one embodiment of the pixel compensation method, the step of determining the center compensation data for the center pixel to be compensated according to the (M−2) sorted compensation reference data and the (M−2) luminance gain data includes:

summing the (M−2) compensation reference data to obtain a sum of the compensation reference data;

averaging the (M−2) luminance gain data to obtain an average of the luminance gain data; and taking a product of the sum of the compensation reference data times the average of the luminance gain data as the center compensation data of the center pixel to be compensated.

In one embodiment of the pixel compensation method, the step of obtaining compensation reference data for M compensation reference pixels adjacent to the center pixel to be compensated includes:

obtaining all target pixels in a (2m+1, 2n+1) pixel array centered at the center pixel to be compensated, and taking the target pixels as the compensation reference pixels, wherein M=(2m+1)*((2n+1)−1 and, m and n both are natural numbers equal to or greater than 1.

In one embodiment of the pixel compensation method, the step of obtaining all target pixels in a (2m+1, 2n+1) pixel array centered at the center pixel to be compensated includes:

obtaining the first compensation data of the first subpixel and calculated second compensation data of the second subpixel in the (2m+1, 2n+1) pixel array centered at the center pixel to be compensated and taking the first compensation data and the second compensation as the compensation reference pixel.

Another embodiment of the disclosure further provides a pixel compensation structure, including pixel unit to be compensated, wherein the pixel unit to be compensated includes first subpixels and second subpixels disposed adjacent to and arranged alternately with the first subpixels, the first subpixels are provided with sensing parts configured to sense brightness intensity, each two adjacent sensing parts are connected to a same sensing line, and the pixel compensation structure is configured to perform the aforementioned pixel compensation method.

In one embodiment of the pixel compensation structure, a first pixel unit and a second pixel unit both are four-color pixel unit.

In one embodiment of the pixel compensation structure, first pixel units and second pixel units are staggered in column and in row.

In one embodiment of the pixel compensation structure, first pixel units and second pixel units are staggered in column or in row.

In one embodiment of the pixel compensation structure, first pixel units and second pixel units are regularly arranged in row.

In one embodiment of the pixel compensation structure, first pixel units and second pixel units are regularly arranged in column.

Another embodiment of the disclosure further provides a display panel, including the aforementioned pixel compensation structure.

In comparison with prior art, the disclosure drives the pixel unit to be compensated that needs to be pixel compensated to emit light, obtains real optical sensing data of the pixel unit to be compensated by the first subpixel provided with the sensing part configured to sense brightness intensity, determines first compensation data for the first subpixel according to the real optical sensing data, and determines second compensation data for the second subpixel configured with no sensing part according to the first compensation data to compensate all pixels of the pixel unit to be compensated. Because only the first subpixel is configured with the sensing part in the present application, the complexity of hardware design is reduced, the complexity of the pixel driving process is correspondingly reduced, and the purpose of fast compensation and storage space saving is achieved.

DESCRIPTION OF SPECIFIC EMBODIMENTS OF THE INVENTION

The technical solutions in the embodiments of the present application will be clearly and completely described below with reference to the drawings in the embodiments of the present application. Obviously, the described embodiments are only some of the embodiments of the present invention, but not all of the embodiments. Based on the embodiments of the present invention, all other embodiments obtained by those skilled in the art without creative efforts shall fall within the protection scope of the present invention.

In the description of the present invention, it should be understood that the terms “first” and “second” are only used for description purposes and cannot be interpreted as indicating or implying relative importance or implying quantity of the indicated technical features. Thus, features defined as “first”, “second” may expressly or implicitly include one or more of said features. In the description of the present invention, “plurality” means two or more, unless otherwise expressly and specifically defined.

In this application, the word “exemplary” is used to mean “serving as an example, illustration, or description.” Any embodiment described in this application as “exemplary” is not necessarily to be construed as preferred or advantageous over other embodiments. The following description is presented to enable any person skilled in the art to make and use the present invention. In the following description, details are set forth for the purpose of explanation. It will be understood by one of ordinary skill in the art that the present invention may be practiced without the use of these specific details. In other instances, well-known structures and procedures have not been described in detail so as not to obscure the description of the present invention with unnecessary detail. Thus, the present invention is not intended to be limited to the embodiments shown but is to be accorded the widest scope consistent with the principles and features disclosed herein.

In order to solve the above problems, embodiments of the present application provide a pixel compensation method, a pixel compensation structure, and a display panel, which will be described in detail below.

Figure 6:
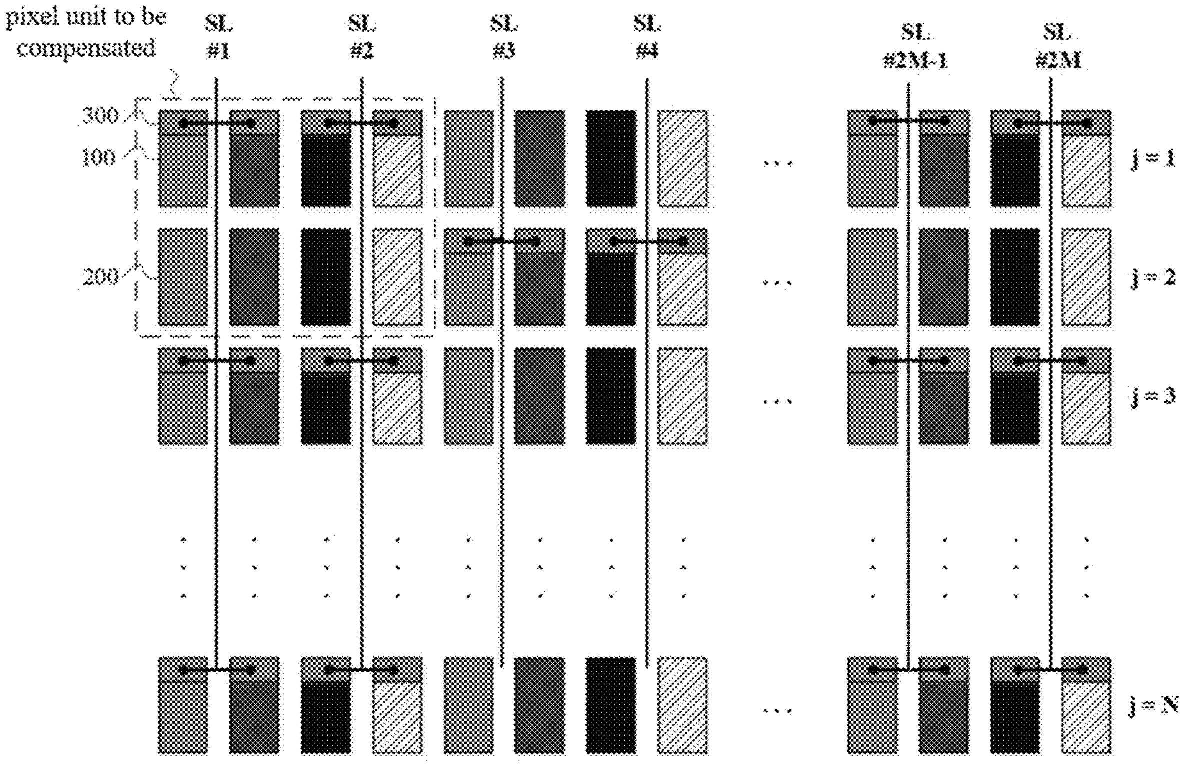
FIG. 6 is a schematic view of a structure of a pixel compensation structure of an embodiment of the present disclosure.

First, the present application provides a pixel compensation structure. As shown in FIG. 6, the pixel compensation method structure includes a pixel unit to be compensated, and the pixel unit to be compensated includes a first subpixel 100 and a second subpixel 200 adjacent to and staggered with the first subpixel 100. The first subpixel 100 is provided with a sensing part 300 for sensing brightness intensity, and every two adjacent sensing parts 300 are connected to a same sensing line.

Figure 7:
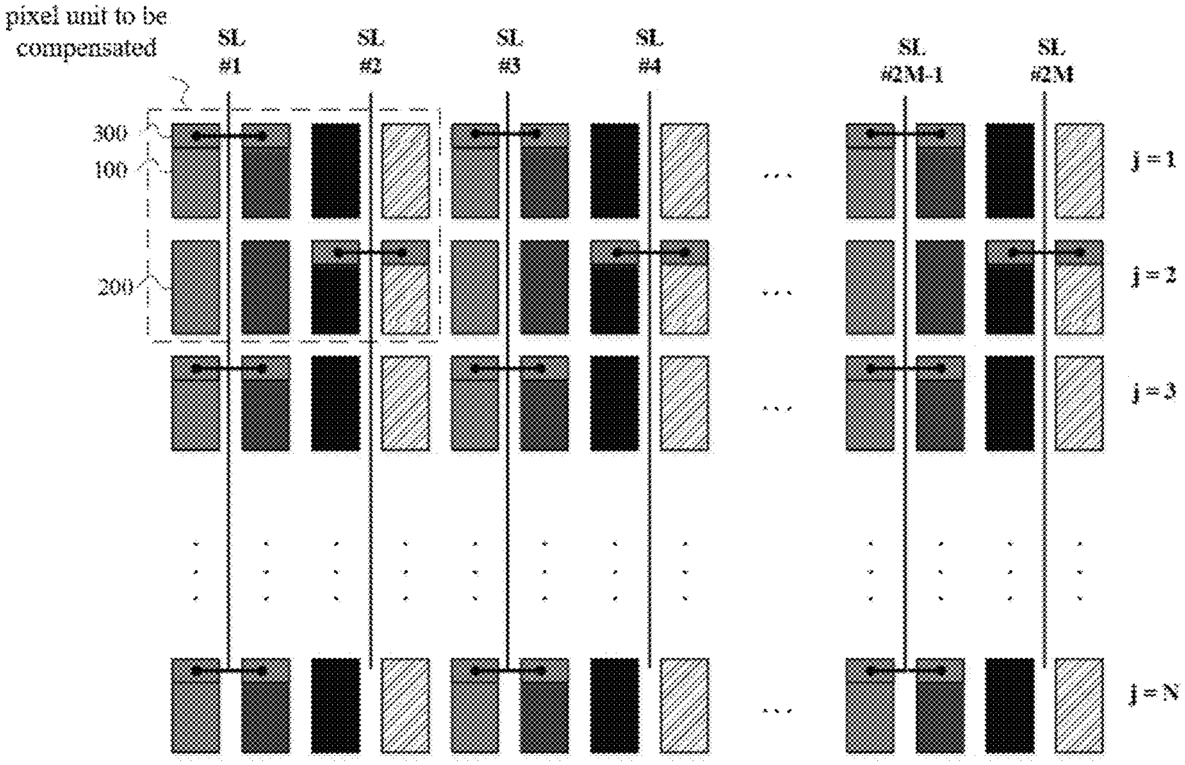
FIG. 7 is a schematic view of a structure of a pixel compensation structure of an embodiment of the present disclosure.

In this embodiment, the pixel compensation structure includes a pixel unit to be compensated, and the pixel unit to be compensated includes a plurality of first subpixels 100 and a plurality of second subpixels 200. Every four adjacent first subpixels 100 constitute a first pixel unit. Every four adjacent second subpixels 200 constitute a second pixel unit. The first pixel unit and the second pixel unit are both four-color pixel units. The four subpixels of the first pixel unit and the second pixel unit are arranged in order that adds white (White) based on red (Red), green (Green), and blue (Blue). Wherein the staggered arrangement of the first subpixels 100 and the second subpixels 200 may be staggered in row and in column as shown in FIG. 6, staggered in column (or in row) as shown in FIG. 7, arrangement without stagger, or other arrangement. In this embodiment, the arrangement of the first subpixel and the second subpixel is not specifically limited, where j refers to the number of rows of the pixel unit, and SL refers to sensing lines connected to the pixels in the pixel unit.

In this embodiment, every two adjacent first subpixels 100 share one sensing line. Exemplarily, the sensing parts 300 on the red subpixels and the sensing parts 300 on the green subpixels share one sensing line as a group. The sensing parts 300 on the blue subpixels and the sensing parts 300 on the white subpixels share one sensing line as a group. Wherein, the greater the sharing ratio of the sensing lines, the fewer sensing lines are needed, the simpler the hardware design, and the lower the design cost. Therefore, in this embodiment, the number of sensing lines and the manner that plurality of subpixels sharing the sensing lines is not specifically limited.

Figure 8:
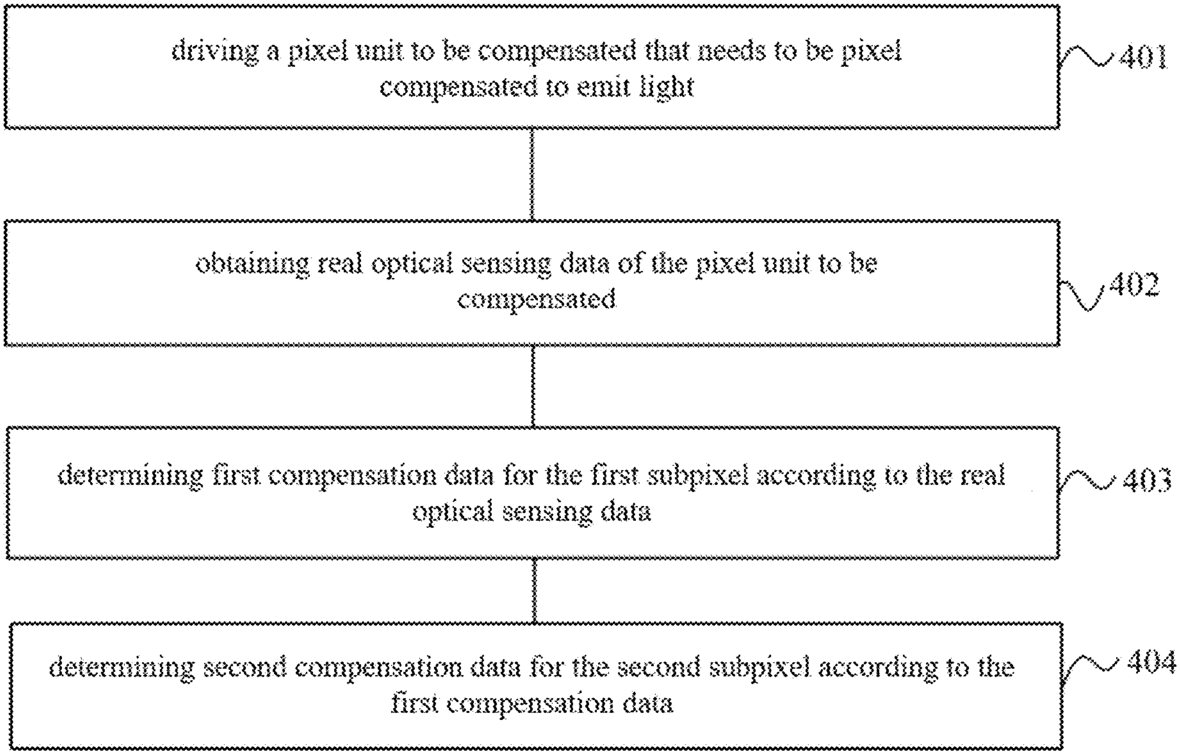
FIG. 8 is a schematic flowchart of a pixel compensation method of an embodiment of the present disclosure.

In order to better implement the pixel compensation structure in the embodiment of the present application, on the basis of the pixel compensation structure, the embodiment of the present application further provides a pixel compensation method, as shown in FIG. 8, which is a schematic flowchart of pixel compensation method of an embodiment of the present application. the pixel compensation method includes the following steps 401-404:

Step 401: Driving a pixel unit to be compensated that needs to be pixel compensated to emit light.

A suitable driving voltage is input to the pixel unit to be compensated through an external driving circuit, and the pixel unit to be compensated that needs to be pixel compensated is driven to emit light.

In this embodiment, a time-division grouping driving mode is adopted. In detail, the pixel unit to be compensated includes a plurality of subpixels to be compensated with different pixel colors. Driving the pixel unit to be compensated that needs to be pixel compensated to emit light includes: according to an arrangement sequence of the pixel colors in the subpixels to be compensated, in a continuous period of time, intermittently drives a plurality of subpixels to be compensated to emit light in sequence.

With the above driving method, when driving for the first time, all subpixels to be compensated in one pixel color of the pixel unit to be compensated are first driven to emit light, and after a period of time, all subpixels to be compensated for another pixel color of the pixel unit to be compensated are driven to emit light. This step is repeated until all the subpixels to be compensated in the pixel unit to be compensated completely emit light.

Step 402: obtaining real optical sensing data of the pixel unit to be compensated. The pixel unit to be compensated includes a first subpixel 100 and a second subpixel 200 adjacent to the first subpixel 100, and the first subpixel 100 is provided with a sensing part 300 for detecting brightness intensity.

Figure 1:
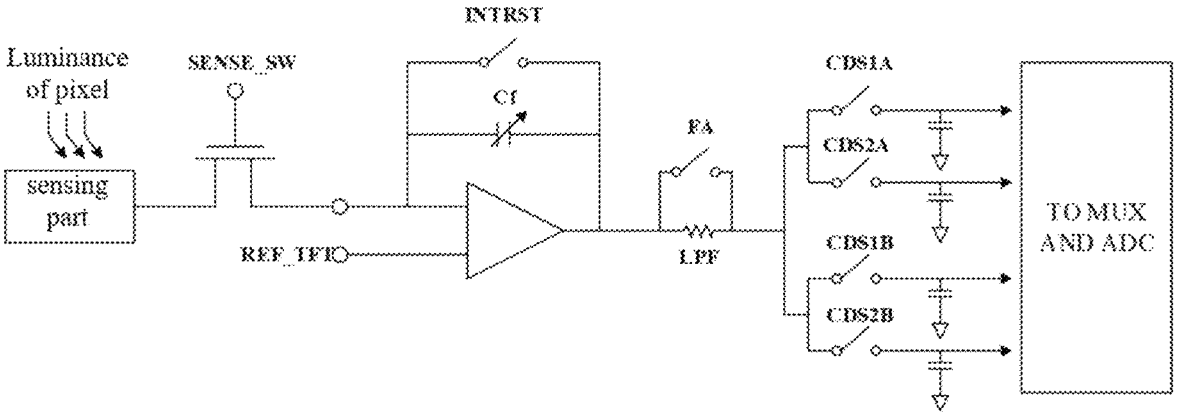
FIG. 1 is a schematic view of a structure of a photosensitive detection circuit of prior art.
Figure 2:
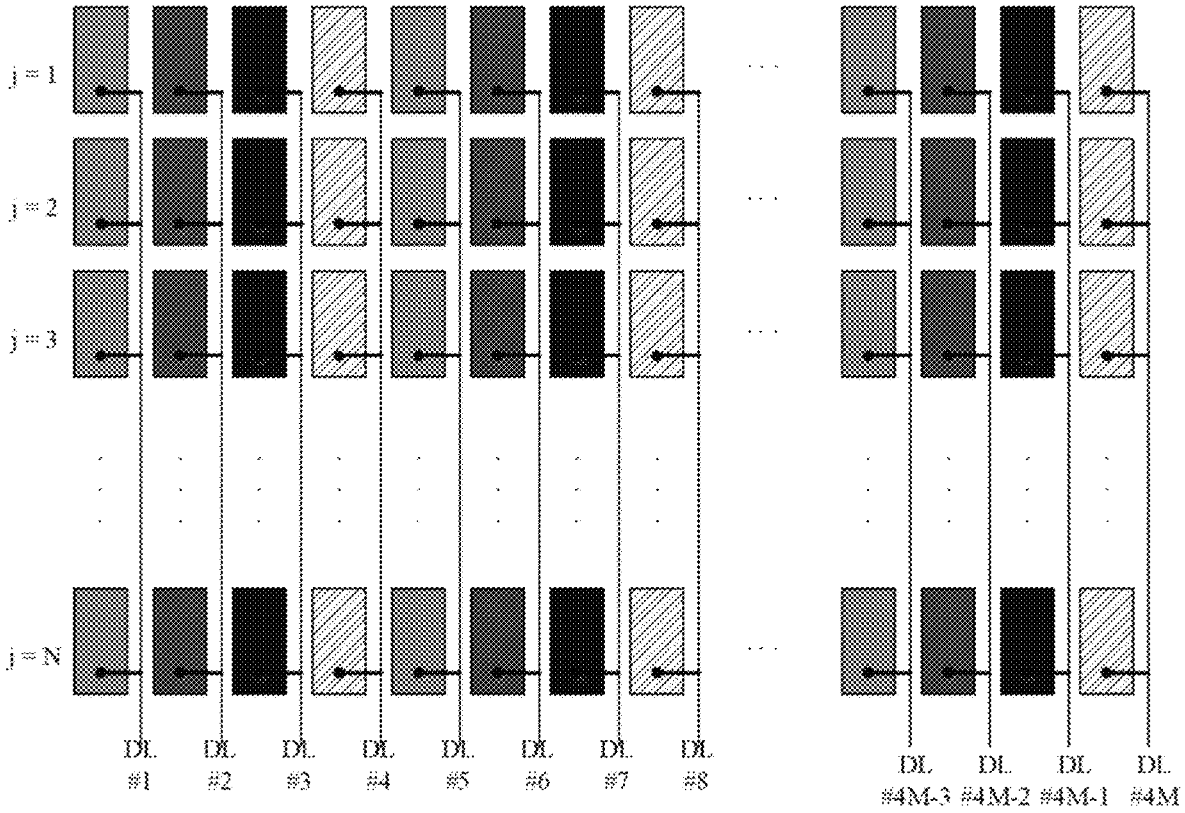
FIG. 2 is a schematic view of a structure of a pixel compensation structure of the present disclosure.
Figure 3:
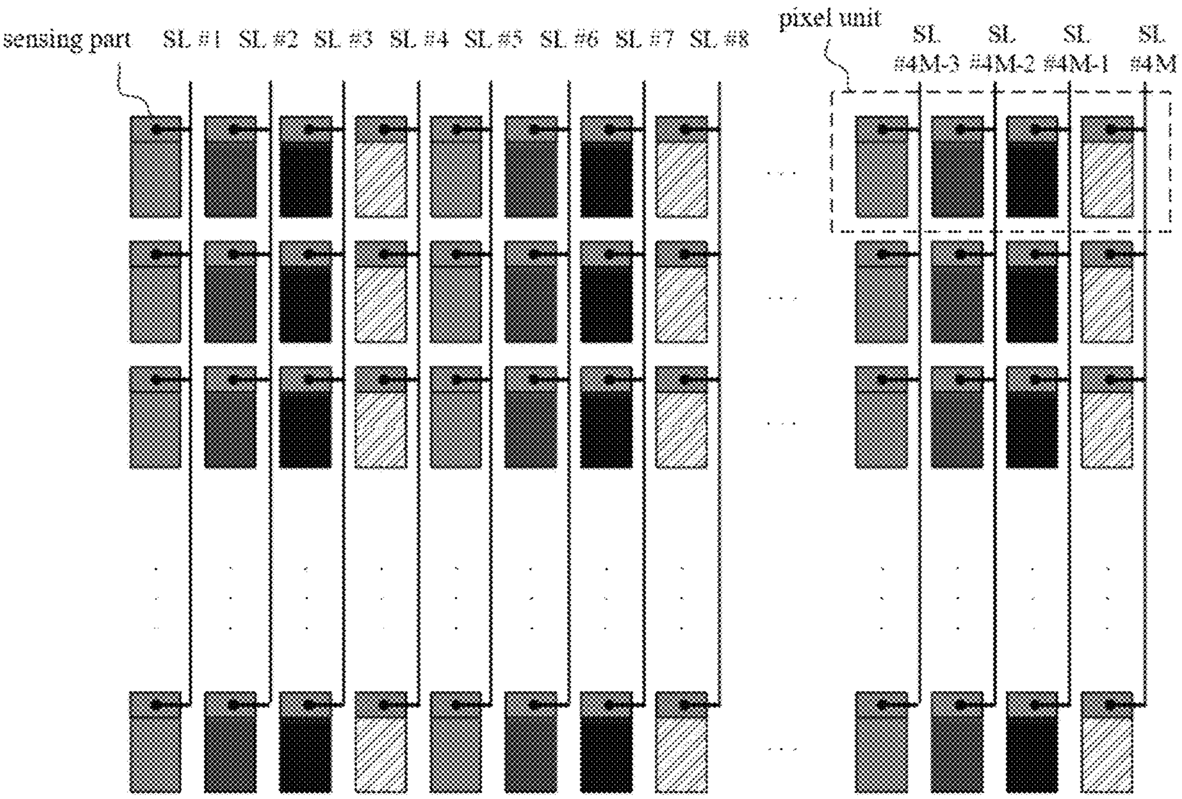
FIG. 3 is a schematic view of a structure of a pixel compensation structure of the present disclosure.
Figure 4:
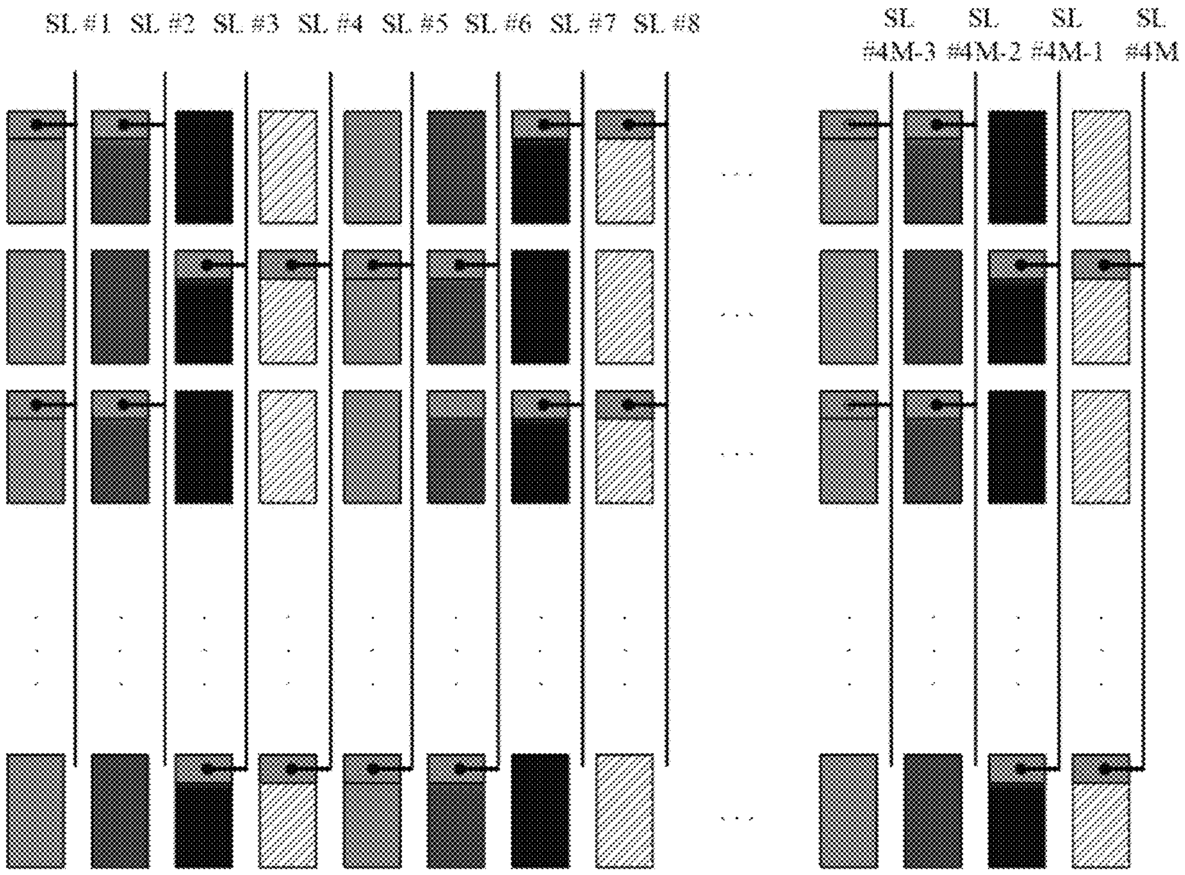
FIG. 4 is a schematic view of a structure of a pixel compensation structure of the present disclosure.
Figure 5:
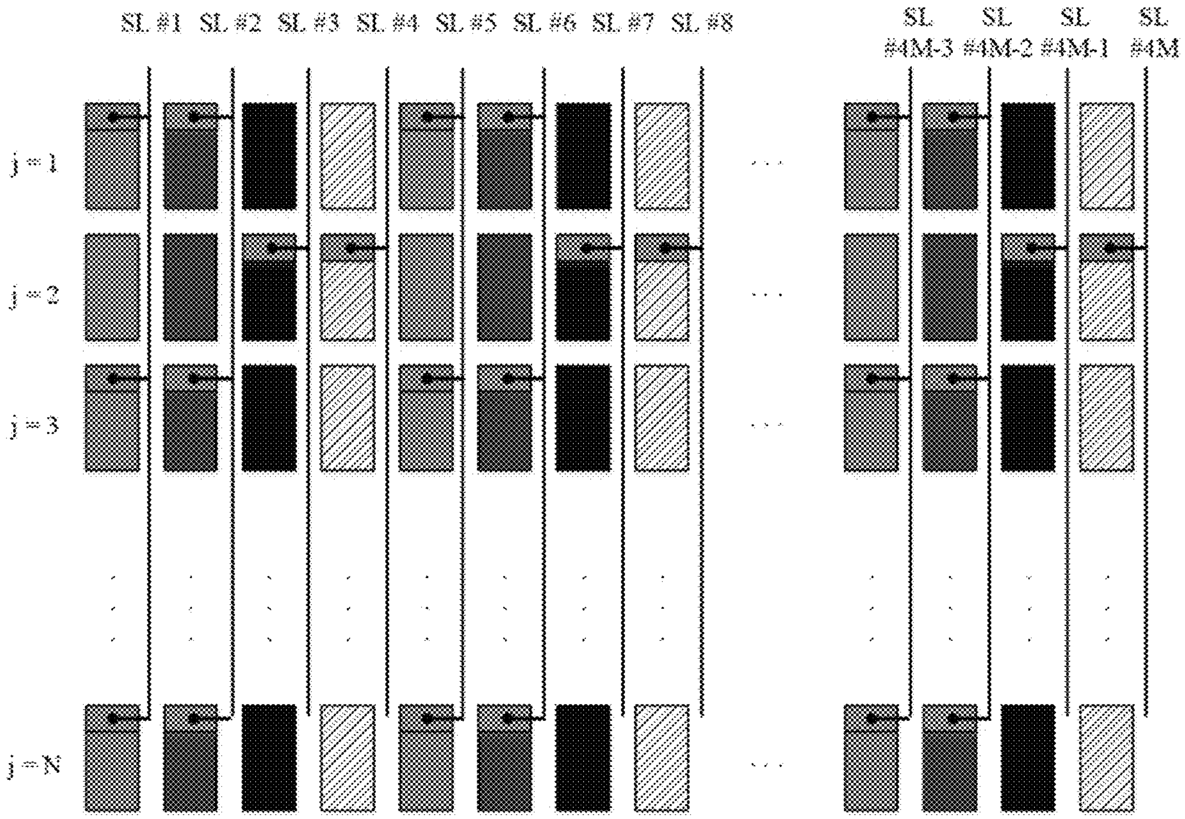
FIG. 5 is a schematic view of a structure of a pixel compensation structure of the present disclosure.

In the process of inputting the driving voltage to emit light, the pixel unit to be compensated detects the luminance of the pixel unit to be compensated by the sensing part 300 configured in the first subpixel 100. Based on the circuit shown in FIG. 1, the sensing part 300 detects current and voltage changes in the detection process and finally forms corresponding current data in the current multiplier. The current data is the real optical sensing data of the pixel unit to be compensated. The real optical sensing data can also be other forms of data, such as voltage data, etc., and are not specifically limited in this embodiment.

When the pixel unit to be compensated displays mixing color, the real optical sensing data detected by the sensing part 300 deviates. In order to collect the real optical sensing data of all pixels in the pixel unit to be compensated in advance, and to ensure the collected real optical sensing data more accurately, when designing grouped driving, the optical sensing data of subpixels to be compensated for different pixel colors can be obtained in a time-division manner. Therefore, driving the pixel unit to be compensated that needs to be pixel compensated to emit light includes:

obtaining a plurality of fusion optical sensing data corresponding to the plurality of subpixels to be compensated with different pixel colors in order. The fusion optical sensing data is optical sensing data obtained at a moment that a plurality of pixels to be compensated with a same color emit light simultaneously. Takes the plurality of fusion optical sensing data as the real optical sensing date of the pixel unit to be compensated.

Because the first subpixels 100 and the second subpixels 200 are staggered and only the first subpixel 100 is provided with the sensing part 300, when multiple subpixels to be compensated of the same color in the subpixel unit to be compensated are illuminated in a period of time, the sensing part 300 can simultaneously perform brightness detecting on the surrounding first subpixel 100 and the second subpixel 200 of the same color to obtain the fusion optical sensing data corresponding to the color. After the detection is completed, continue to perform brightness detecting of the first subpixel 100 and the second subpixel 200 around it by the sensing part 300, and repeat the above steps until the fusion optical sensing data of all the subpixels of the same color are obtained. After that, a plurality of fused optical sensing data are integrated as the real optical sensing data of the pixel unit to be compensated. The optical sensing method is adopted to effectively improve the efficiency of obtaining the optical sensing data of the pixel unit to be compensated.

Step 403: determining first compensation data for the first subpixel 100 according to the real optical sensing data.

The real optical sensing data includes the first real optical sensing data corresponding to the first subpixel 100. After all the real optical sensing data are collected in the previous steps, a gray-scale-brightness characteristic curve associated with the subpixel 100 can be generated based on the first real optical sensing data. Determines the first compensation data of the first subpixel 100 according to the gray-scale-brightness characteristic curve associated with the first subpixel 100.

In detail, determine the first compensation data of the first subpixel 100 includes: obtaining first theoretical optical sensing data for the first subpixel 100, and determining the first compensation data for the first subpixel 100 according to the first theoretical optical sensing data and the first real optical sensing data.

In this embodiment, the driving signal for driving the first subpixel 100 to display a specified grayscale value is set as a driving signal V1. After the driving signal V1 is applied to the first subpixel 100, the obtained optical sensing data by the sensing part 300 is the first real optical sensing data corresponding to the first subpixel. According to the gray-scale-brightness characteristic curve, the inferred sensing data is the first theoretical optical sensing data corresponding to the first subpixel when driving signal V1 is applied to the first subpixel 100. Therefore, by comparing the first real optical sensing data with the first theoretical optical sensing data, a brightness compensation value of the first subpixel can be obtained. The first compensation data can be determined according to the brightness compensation value.

Step 404: determining second compensation data for the second subpixel 200 according to the first compensation data.

Because each second subpixel in the second pixel unit 200 does not have a sensing device, it is difficult to directly detect the accurate brightness intensity of the second subpixel when displaying the specified grayscale value, and because difference in component characteristics of first pixel unit 100 adjacent to the second pixel unit 200 is small, in this embodiment, the optical sensing data of the plurality of first pixel units 100 that are closest to the second pixel unit 200 can be used to determine the second compensation data corresponding to the second pixel unit 200.

The disclosure drives the pixel unit to be compensated that needs to be pixel compensated to emit light, obtains real optical sensing data of the pixel unit to be compensated by the sensing part 300 which is configured in first subpixel 100 provided and configured to sense brightness intensity, determines first compensation data for the first subpixel 100 according to the real optical sensing data, and determines second compensation data for the second subpixel 200 configured with no sensing part 300 according to the first compensation data to compensate all pixels of the pixel unit to be compensated. Because only the first subpixel 100 is configured with the sensing part 300 in the present application, the complexity of hardware design is reduced, the complexity of the pixel driving process is correspondingly reduced, and the purpose of fast compensation and storage space saving is achieved.

In the present application, after obtaining the optical sensing data of a plurality of first subpixels 100 and another second subpixels 200 closest to the second subpixel 200 to be compensated, and then based on the set algorithm, the optical sensing data of the plurality of first subpixels 100 and another second subpixels 200 are calculated to obtain the second compensation data for the second subpixel 200 that currently needs to be compensated.

In another embodiment of the present application, the real optical sensing data includes second real optical sensing data corresponding to the second subpixel 200. Before calculating the second compensation data corresponding to the second subpixel 200, it is necessary to determine a plurality of first subpixels 100 that are closest to the second subpixel 200 that needs to be compensated currently. Therefore, the step of determining the second compensation data of the second subpixel 200 according to the first compensation data, includes:

taking the second subpixel 200 that needs to be compensated currently as a center pixel to be compensated; obtaining compensation reference data for M compensation reference pixels adjacent to the center pixel to be compensated, wherein the M compensation reference pixels includes the first subpixel 100, the compensation reference data includes the first compensation data, and M is a natural number; determining center compensation data for the center pixel to be compensated according to the compensation reference data for the M compensation reference pixels; and taking the center compensation data as the second compensation data for the second subpixel 200 that needs to be compensated currently.

In this embodiment, the step of obtaining compensation reference data for M compensation reference pixels adjacent to the center pixel to be compensated includes: obtaining all target pixels in a (2m+1, 2n+1) pixel array centered at the center pixel to be compensated, taking the target pixels as the compensation reference pixels, wherein $M=(2m+1)*((2n+1)-1$ and, m and n both are natural numbers equal to or greater than 1.

That is, all the target pixels in the (2m+1, 2n+1) pixel array center at the second subpixel 200 that currently needs to be compensated are taken as compensation reference pixels, wherein the compensation reference pixels may include the first compensation data and other already calculated second compensation data of the second subpixel 200. The currently calculated second compensation data of the second subpixel 200 is calculated based on these compensation reference pixels.

Exemplarily, when m=2, n=2, then M=24, which means that the second subpixel 200 that needs to be compensated is taken as the center, and all the target pixels within the (5, 5) pixel array around the second subpixel 200 are obtained and taken as compensation reference pixels, that is, the 24 target pixels around the second subpixel 200 are taken as compensation reference pixels, and then based on the 24 compensation reference pixels, the set algorithm is used to calculate the second compensation data of the subpixel 200 that currently needs to be compensated.

The algorithm for calculating the second compensation data of the second subpixel 200 that currently needs to be compensated may be obtain by calculating an intermediate value of a plurality of optical sensing data closest to the second subpixel 200, or by calculating an average with gain weight of the plurality of optical sensing data closest to the second subpixel 200. The two algorithms for determining the second compensation data corresponding to the second subpixel 200 that currently needs to be compensated will be described in detail below.

In another embodiment of the present application, the second compensation data corresponding to the second subpixel 200 that currently needs to be compensated is obtained by calculating the intermediate value. In detail, the method is determining the center compensation data for the center pixel to be compensated according to the compensation reference data for the M compensation reference pixels, which includes:

sorting the M compensation reference data according to value of the compensation reference data to obtain M sorted compensation reference data; omitting a first and a last of the M sorted compensation reference data to obtain (M−2) sorted compensation reference data; and taking a center value of the (M−2) sorted compensation reference data as the center compensation data for the center pixel to be compensated.

Exemplarily, when m=1, n=1, then M=8, that is, 8 compensation reference data around the center pixel to be compensated are selected for calculation. The 8 compensation reference data are sorted according to the numerical value. The sorted 8 compensation reference data is specifically [100, 350, 360, 365, 370, 380, 390, 800]. After deleting the minimum and maximum values in the sorted 8 compensation reference data, the remaining sorted 6 compensation reference data are [350, 360, 365, 370, 380, 390]. Calculate the intermediate value of these 6 compensation reference data (365+370)/2=367.5. Take the intermediate value as the center compensation data corresponding to the center pixel to be compensated, that is, take 367.5 as the second compensation data corresponding to the second subpixel 200 currently to be compensated.

In another embodiment of the present application, the second compensation data corresponding to the second subpixel 200 that currently needs to be compensated is obtained by calculating the gain weighted average. In detail, the method of determining the center compensation data for the center pixel to be compensated according to the compensation reference data for the M compensation reference pixels further includes:

determining (M−2) luminance gain data according to the (M−2) sorted compensation reference data, wherein the (M−2) luminance gain data correspond to the (M−2) sorted compensation reference data in one to one; and determining the center compensation data for the center pixel to be compensated according to the (M−2) sorted compensation reference data and the (M−2) luminance gain data.

In this embodiment, the step of determining the center compensation data for the center pixel to be compensated according to the (M−2) sorted compensation reference data and the (M−2) luminance gain data includes:

summing the (M−2) compensation reference data to obtain a sum of the compensation reference data;

averaging the (M−2) luminance gain data to obtain an average of the luminance gain data; and taking a product of the sum of the compensation reference data times the average of the luminance gain data as the center compensation data of the center pixel to be compensated.

Exemplarily, continue to take the example given above as an example, when m=1, n=1, M=8, after deleting the minimum and maximum values from the sorted 8 compensation reference data, the obtained 6 compensation reference data are [350, 360, 365, 370, 380, 390], and then 6 luminance gain data corresponding to the 6 compensation reference data are obtained respectively. In this embodiment, it is set that the 6 luminance gain data corresponding to the 6 compensation reference data are [0.1, 0.1, 0.3, 0.1, 0.3, 0.1]. After summing the 6 compensation reference data, then multiply the average value of the 6 luminance gain data to obtain the final product value: 370.5, that is, 370.5 is taken as the second compensation data corresponding to the second subpixel 200 currently to be compensated.

In another embodiment of the present application, a display panel is provided, and the display panel includes the pixel compensation structure.

The pixel compensation method, the pixel compensation structure, and the display panel provided by the embodiments of the present application have been described in detail above. The principles and implementations of the present invention are described with specific examples. The descriptions of the above embodiments are only used for help understand the method of the present invention and its core idea; at the same time, for those skilled in the art, according to the idea of the present invention, there will be changes in the specific implementation and application scope. In summary, the content of this specification should not be construed as a limitation of the present invention.

What is claimed is:

1. A pixel compensation method, comprising:

driving a pixel unit to be compensated that needs to be pixel compensated to emit light;

obtaining real optical sensing data of the pixel unit to be compensated, wherein the pixel unit to be compensated comprises a first subpixel and a second subpixel disposed adjacent to the first subpixel, and the first subpixel is provided with a sensing part configured to sense brightness intensity;

determining first compensation data for the first subpixel according to the real optical sensing data; and determining second compensation data for the second subpixel according to the first compensation data;

wherein the real optical sensing data comprises first real optical sensing data for the first subpixel, and the step of determining first compensation data for the first subpixel according to the real optical sensing data comprises:

generating a gray-scale-brightness characteristic curve associated with the first subpixel according to the first real optical sensing data; and determines the first compensation data of the first subpixel according to the gray-scale-brightness characteristic curve associated with the first subpixel;

wherein the real optical sensing data comprises second real optical sensing data for the second subpixel, and the step of determining the second compensation data for the second subpixel according to the first compensation data comprises:

taking the second subpixel that needs to be compensated currently as a center pixel to be compensated;

obtaining compensation reference data for M compensation reference pixels adjacent to the center pixel to be compensated, wherein the M compensation reference pixels comprises the first subpixel, the compensation reference data comprises the first compensation data, and M is a natural number;

determining center compensation data for the center pixel to be compensated according to the compensation reference data for the M compensation reference pixels; and taking the center compensation data as the second compensation data for the second subpixel that needs to be compensated currently.

2. The pixel compensation method according to claim 1, wherein the pixel unit to be compensated comprises a plurality of subpixels to be compensated with different pixel colors, and the step of driving the pixel unit to be compensated that needs to be pixel compensated to emit light comprises:

intermittently driving the plurality of subpixels to be compensated to emit light in an order according to an arrangement of the pixel colors of the plurality of subpixels to be compensated in a continuous period of time.

3. The pixel compensation method according to claim 1, wherein the sensing part comprises a current multiplier, the step of obtaining the real optical sensing data of the pixel unit to be compensated comprises:

obtaining current data and voltage data of the current multiplier in the sensing part, and taking the current data and the voltage data of the current multiplier as the real optical sensing data.

4. The pixel compensation method according to claim 3, wherein the step of obtaining the real optical sensing data of the pixel unit to be compensated comprises:

obtaining a plurality of fusion optical sensing data corresponding to the plurality of subpixels to be compensated with different pixel colors in order; and taking the plurality of fusion optical sensing data as the real optical sensing date of the pixel unit to be compensated.

5. The pixel compensation method according to claim 4, wherein the step of obtaining a plurality of fusion optical sensing data corresponding to the plurality of subpixels to be compensated with different pixel colors in order comprises:

turning on the plurality of subpixels to be compensated with a same color in the pixel unit to be compensated in a period; and sensing brightness of surrounding ones of the first subpixels and the second subpixels with a same color to obtain the fusion optical sensing data corresponding to the color.

6. The pixel compensation method according to claim 1, wherein the step of determines the first compensation data of the first subpixel according to the gray-scale-brightness characteristic curve associated with the first subpixel comprises:

obtaining first theoretical optical sensing data for the first subpixel; and determining the first compensation data for the first subpixel according to the first theoretical optical sensing data and the first real optical sensing data.

7. The pixel compensation method according to claim 1, wherein the step of determining the center compensation data for the center pixel to be compensated according to the compensation reference data for the M compensation reference pixels comprises:

sorting the M compensation reference data according to value of the compensation reference data to obtain M sorted compensation reference data;

omitting a first and a last of the M sorted compensation reference data to obtain (M−2) sorted compensation reference data; and taking a center value of the (M−2) sorted compensation reference data as the center compensation data for the center pixel to be compensated.

8. The pixel compensation method according to claim 7, wherein the step of determining the center compensation data for the center pixel to be compensated according to the compensation reference data for the M compensation reference pixels further comprises:

determining (M−2) luminance gain data according to the (M−2) sorted compensation reference data, wherein the (M−2) luminance gain data correspond to the (M−2) sorted compensation reference data in one to one; and determining the center compensation data for the center pixel to be compensated according to the (M−2) sorted compensation reference data and the (M−2) luminance gain data.

9. The pixel compensation method according to claim 8, wherein the step of determining the center compensation data for the center pixel to be compensated according to the (M−2) sorted compensation reference data and the (M−2) luminance gain data comprises:

summing the (M−2) compensation reference data to obtain a sum of the compensation reference data;

averaging the (M−2) luminance gain data to obtain an average of the luminance gain data; and taking a product of the sum of the compensation reference data times the average of the luminance gain data as the center compensation data of the center pixel to be compensated.

10. The pixel compensation method according to claim 1, wherein the step of obtaining compensation reference data for M compensation reference pixels adjacent to the center pixel to be compensated comprises:

obtaining all target pixels in a (2m+1, 2n+1) pixel array centered at the center pixel to be compensated, and taking the target pixels as the compensation reference pixels, wherein $M=(2m+1)*(2n+1)-1$ and, m and n both are natural numbers equal to or greater than 1.

11. The pixel compensation method according to claim 10, wherein the step of obtaining all target pixels in a (2m+1, 2n+1) pixel array centered at the center pixel to be compensated comprises:

obtaining the first compensation data of the first subpixel and calculated second compensation data of the second subpixel in the (2m+1, 2n+1) pixel array centered at the center pixel to be compensated and taking the first compensation data and the second compensation as the compensation reference pixel.

12. A pixel compensation structure, comprising pixel unit to be compensated, wherein the pixel unit to be compensated comprises first subpixels and second subpixels disposed adjacent to and arranged alternately with the first subpixels, the first subpixels are provided with sensing parts configured to sense brightness intensity, the second subpixels are not provided with the sensing parts, each two adjacent sensing parts are connected to a same sensing line, and the pixel compensation structure is configured to perform the pixel compensation method according to claim 1.

13. The pixel compensation structure according to claim 12, wherein a first pixel unit and a second pixel unit both are four-color pixel unit.

14. The pixel compensation structure according to claim 12, wherein first pixel units and second pixel units are staggered in column and in row.

15. The pixel compensation structure according to claim 12, wherein first pixel units and second pixel units are staggered in column or in row.

16. The pixel compensation structure according to claim 12, wherein first pixel units and second pixel units are regularly arranged in row.

17. The pixel compensation structure according to claim 12, wherein first pixel units and second pixel units are regularly arranged in column.

18. A display panel, comprising the pixel compensation structure according to claim 12.

* * * * *